United States Patent
Chinthekindi et al.

(10) Patent No.: US 10,860,212 B1
(45) Date of Patent: Dec. 8, 2020

(54) METHOD OR AN APPARATUS TO MOVE PERFECT DE-DUPLICATED UNIQUE DATA FROM A SOURCE TO DESTINATION STORAGE TIER

(71) Applicant: EMC IP Holding Company LLC, Hopkinton, MA (US)

(72) Inventors: Ramprasad Chinthekindi, Pune (IN); Nitin Madan, Gurugram (IN); Abhinav Duggal, Santa Clara, CA (US); Lan Bai, Chelsea, MI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 91 days.

(21) Appl. No.: 15/656,588

(22) Filed: Jul. 21, 2017

(51) Int. Cl.
| | |
|---|---|
| *G06F 16/00* | (2019.01) |
| *G06F 3/06* | (2006.01) |
| *G06F 16/27* | (2019.01) |
| *G06F 16/185* | (2019.01) |
| *G06F 16/174* | (2019.01) |
| *G06F 16/22* | (2019.01) |

(52) U.S. Cl.
CPC ............ *G06F 3/0608* (2013.01); *G06F 3/065* (2013.01); *G06F 3/0619* (2013.01); *G06F 3/0647* (2013.01); *G06F 3/0652* (2013.01); *G06F 16/1748* (2019.01); *G06F 16/185* (2019.01); *G06F 16/2255* (2019.01); *G06F 16/27* (2019.01)

(58) Field of Classification Search
CPC ...................................................... G06F 16/00
See application file for complete search history.

(56) References Cited

U.S. PATENT DOCUMENTS

| | | |
|---|---|---|
| 7,085,911 B2 | 8/2006 | Sachedina et al. |
| 7,818,515 B1 | 10/2010 | Umbehocker et al. |
| 8,046,551 B1 | 10/2011 | Sahin |
| 8,190,835 B1 | 5/2012 | Yueh |
| 8,204,868 B1 | 6/2012 | Wu et al. |
| 8,396,841 B1 | 3/2013 | Janakiraman |
| 8,732,403 B1 | 5/2014 | Nayak |

(Continued)

FOREIGN PATENT DOCUMENTS

| | | |
|---|---|---|
| EP | 2738665 A1 | 6/2014 |
| WO | 2013056220 A1 | 4/2013 |

(Continued)

OTHER PUBLICATIONS

International Search Report and Written Opinion issued in corresponding PCT Application PCT/US2018/027646, dated Jul. 27, 2018. (30 pages).

(Continued)

*Primary Examiner* — Khanh B Pham
(74) *Attorney, Agent, or Firm* — Chamberlain, Hrdlicka, White, Williams & Aughtry

(57) ABSTRACT

A data management device includes a persistent storage and a processor. The persistent storage includes an object storage that stores segments. The processor generates a collision free hash function based on the segments, generates a hash vector using the collision free hash function, deduplicates a portion of the segments associated with to-be-migrated files using the hash vector, and migrates the to-be-migrated files using the deduplicated portion of the segments to a remote storage.

15 Claims, 10 Drawing Sheets

(56) References Cited

U.S. PATENT DOCUMENTS

| | | | |
|---|---|---|---|
| 8,782,323 B2 | 7/2014 | Glikson et al. | |
| 8,898,114 B1 | 11/2014 | Feathergill et al. | |
| 8,898,120 B1 | 11/2014 | Efstathopoulos | |
| 8,904,120 B1 | 12/2014 | Killammsetti et al. | |
| 8,918,390 B1 | 12/2014 | Shilane et al. | |
| 8,943,032 B1 * | 1/2015 | Xu | G06F 16/119 707/698 |
| 8,949,208 B1 | 2/2015 | Xu et al. | |
| 9,183,200 B1 | 11/2015 | Liu et al. | |
| 9,244,623 B1 | 1/2016 | Bent et al. | |
| 9,250,823 B1 | 2/2016 | Kamat et al. | |
| 9,251,160 B1 | 2/2016 | Wartnick | |
| 9,274,954 B1 | 3/2016 | Bairavasundaram et al. | |
| 9,280,550 B1 | 3/2016 | Hsu et al. | |
| 9,298,724 B1 | 3/2016 | Patil et al. | |
| 9,317,218 B1 * | 4/2016 | Botelho | G06F 3/0655 |
| 9,336,143 B1 | 5/2016 | Wallace et al. | |
| 9,390,116 B1 | 7/2016 | Li et al. | |
| 9,390,281 B2 | 7/2016 | Whaley et al. | |
| 9,424,185 B1 * | 8/2016 | Botelho | G06F 12/0253 |
| 9,442,671 B1 | 9/2016 | Zhang et al. | |
| 9,830,111 B1 | 11/2017 | Patiejunas et al. | |
| 10,002,048 B2 | 6/2018 | Chennamsetty et al. | |
| 10,031,672 B2 | 7/2018 | Wang et al. | |
| 10,078,451 B1 | 9/2018 | Floyd et al. | |
| 10,102,150 B1 | 10/2018 | Visvanathan et al. | |
| 10,175,894 B1 | 1/2019 | Visvanathan et al. | |
| 10,445,292 B1 | 10/2019 | Zhang et al. | |
| 2003/0110263 A1 | 6/2003 | Shillo | |
| 2005/0120058 A1 | 6/2005 | Nishio | |
| 2005/0160225 A1 | 7/2005 | Presler-Marshall | |
| 2005/0182906 A1 | 8/2005 | Chatterjee et al. | |
| 2006/0075191 A1 | 4/2006 | Lolayekar et al. | |
| 2008/0082727 A1 | 4/2008 | Wang | |
| 2008/0133446 A1 | 6/2008 | Dubnicki et al. | |
| 2008/0133561 A1 | 6/2008 | Dubnicki et al. | |
| 2008/0216086 A1 | 9/2008 | Tanaka et al. | |
| 2008/0244204 A1 | 10/2008 | Cremelie et al. | |
| 2009/0235115 A1 | 9/2009 | Butlin | |
| 2009/0271454 A1 | 10/2009 | Anglin et al. | |
| 2010/0049735 A1 * | 2/2010 | Hsu | G06F 16/1727 707/E17.005 |
| 2010/0094817 A1 | 4/2010 | Ben-Shaul et al. | |
| 2010/0250858 A1 | 9/2010 | Cremelie et al. | |
| 2011/0055471 A1 | 3/2011 | Thatcher et al. | |
| 2011/0099200 A1 | 4/2011 | Blount et al. | |
| 2011/0099351 A1 | 4/2011 | Condict | |
| 2011/0161557 A1 | 6/2011 | Haines et al. | |
| 2011/0185149 A1 | 7/2011 | Gruhl et al. | |
| 2011/0196869 A1 | 8/2011 | Patterson et al. | |
| 2011/0231594 A1 | 9/2011 | Sugimoto et al. | |
| 2011/0276781 A1 | 11/2011 | Sengupta et al. | |
| 2012/0158670 A1 | 6/2012 | Sharma et al. | |
| 2012/0209873 A1 | 8/2012 | He | |
| 2012/0278511 A1 | 11/2012 | Alatorre et al. | |
| 2013/0036098 A1 | 2/2013 | Mutalik et al. | |
| 2013/0055018 A1 | 2/2013 | Joshi et al. | |
| 2013/0060739 A1 | 3/2013 | Kalach et al. | |
| 2013/0111262 A1 | 5/2013 | Taylor et al. | |
| 2013/0138620 A1 | 5/2013 | Yakushev et al. | |
| 2014/0012822 A1 | 1/2014 | Sachedina et al. | |
| 2014/0040205 A1 | 2/2014 | Cometto et al. | |
| 2014/0047181 A1 | 2/2014 | Peterson et al. | |
| 2014/0258248 A1 | 9/2014 | Lambright et al. | |
| 2014/0258824 A1 | 9/2014 | Khosla et al. | |
| 2014/0281215 A1 | 9/2014 | Chen et al. | |
| 2014/0310476 A1 | 10/2014 | Kruus | |
| 2015/0074679 A1 | 3/2015 | Fenoglio et al. | |
| 2015/0106345 A1 | 4/2015 | Trimble et al. | |
| 2015/0178171 A1 | 6/2015 | Bish et al. | |
| 2015/0331622 A1 | 11/2015 | Chiu et al. | |
| 2016/0026652 A1 | 1/2016 | Zheng | |
| 2016/0112475 A1 | 4/2016 | Lawson et al. | |
| 2016/0188589 A1 | 6/2016 | Guilford et al. | |
| 2016/0224274 A1 * | 8/2016 | Kato | G06F 3/0647 |
| 2016/0239222 A1 | 8/2016 | Shetty et al. | |
| 2016/0323367 A1 | 11/2016 | Murtha et al. | |
| 2016/0342338 A1 | 11/2016 | Wang | |
| 2017/0093961 A1 | 3/2017 | Pacella et al. | |
| 2017/0199894 A1 | 7/2017 | Aronovich et al. | |
| 2017/0220281 A1 | 8/2017 | Gupta et al. | |
| 2017/0220334 A1 | 8/2017 | Hart et al. | |
| 2017/0300424 A1 | 10/2017 | Beaverson et al. | |
| 2017/0352038 A1 | 12/2017 | Parekh et al. | |
| 2017/0359411 A1 | 12/2017 | Burns et al. | |
| 2018/0089037 A1 | 3/2018 | Liu et al. | |
| 2018/0146068 A1 | 5/2018 | Johnston et al. | |
| 2018/0322062 A1 | 11/2018 | Watkins et al. | |

FOREIGN PATENT DOCUMENTS

| | | |
|---|---|---|
| WO | 2013115822 A1 | 8/2013 |
| WO | 2014185918 A1 | 11/2014 |

OTHER PUBLICATIONS

Deepavali Bhagwat et al.; "Extreme Binning: Scalable, Parallel Deduplication for Chunk-based File Backup"; IEEE MASCOTS; Sep. 2009 (10 pages).

Mark Lillibridge et al.; "Sparse Indexing: Large Scale, Inline Deduplication Using Sampling and Locality"; 7th USENIX Conference on File and Storage Technologies, USENIX Association; pp. 111-123; 2009 (13 pages).

Extended European Search Report issued in corresponding European Application No. 18184842.5, dated Sep. 19, 2018.

Jaehong Min et al.; "Efficient Deduplication Techniques for Modern Backup Operation"; IEEE Transactions on Computers; vol. 60, No. 6; pp. 824-840; Jun. 2011.

Daehee Kim et al.; "Existing Deduplication Techniques"; Data Depublication for Data Optimization for Storage and Network Systems; Springer International Publishing; DOI: 10.1007/978-3-319-42280-0_2; pp. 23-76; Sep. 2016.

International Search Report and Written Opinion issued in corresponding WO application No. PCT/US2018/027642, dated Jun. 7, 2018 (15 pages).

Extended European Search Report issued in corresponding European Application No. 18185076.9, dated Dec. 7, 2018 (9 pages).

Lei Xu et al.; "SHHC: A Scalable Hybrid Hash Cluster for Cloud Backup Services in Data Center"; 2011 31st International Conference on Distributed Computing Systems Workshops (ICDCSW); IEEE Computer Society; pp. 61-65; 2011 (5 pages).

Aseem Kishore; "What is a Checksum and How to Calculate a Checksum"; Online Tech Tips; Feb. 18, 2015; https://www.online-tech-tips.com/cool-websites/what-is-checksum/.

\* cited by examiner

METHOD OR AN APPARATUS TO MOVE PERFECT DE-DUPLICATED UNIQUE DATA FROM A SOURCE TO DESTINATION STORAGE TIER

BACKGROUND

Computing devices generate, use, and store data. The data may be, for example, images, document, webpages, or meta-data associated with any of the files. The data may be stored locally on a persistent storage of a computing device and/or may be stored remotely on a persistent storage of another computing device.

SUMMARY

In one aspect, a data management device in accordance with one or more embodiments of the invention includes a persistent storage and a processor. The persistent storage includes an object storage that stores segments. The processor generates a collision free hash function based on the segments, generates a hash vector using the collision free hash function, deduplicates a portion of the segments associated with to-be-migrated files using the hash vector, and migrates the to-be-migrated files using the deduplicated portion of the segments to a remote storage.

In one aspect, a method of operating a data management device in accordance with one or more embodiments of the invention includes generating, by the data management device, a collision free hash function based on segments stored in an object storage; generating, by the data management device, a hash vector using the collision free hash function; deduplicating, by the data management device, a portion of the segments associated with to-be-migrated files stored in the object storage using the hash vector; and migrating, by the data management device, the to-be-migrated files using the deduplicated portion of the segments to a remote storage.

In one aspect, a non-transitory computer readable medium in accordance with one or more embodiments of the invention includes computer readable program code, which when executed by a computer processor enables the computer processor to perform a method for operating a data management device, the method includes generating, by the data management device, a collision free hash function based on segments stored in an object storage; generating, by the data management device, a hash vector using the collision free hash function; deduplicating, by the data management device, a portion of the segments associated with to-be-migrated files stored in the object storage using the hash vector; and migrating, by the data management device, the to-be-migrated files using the deduplicated portion of the segments to a remote storage.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1A:
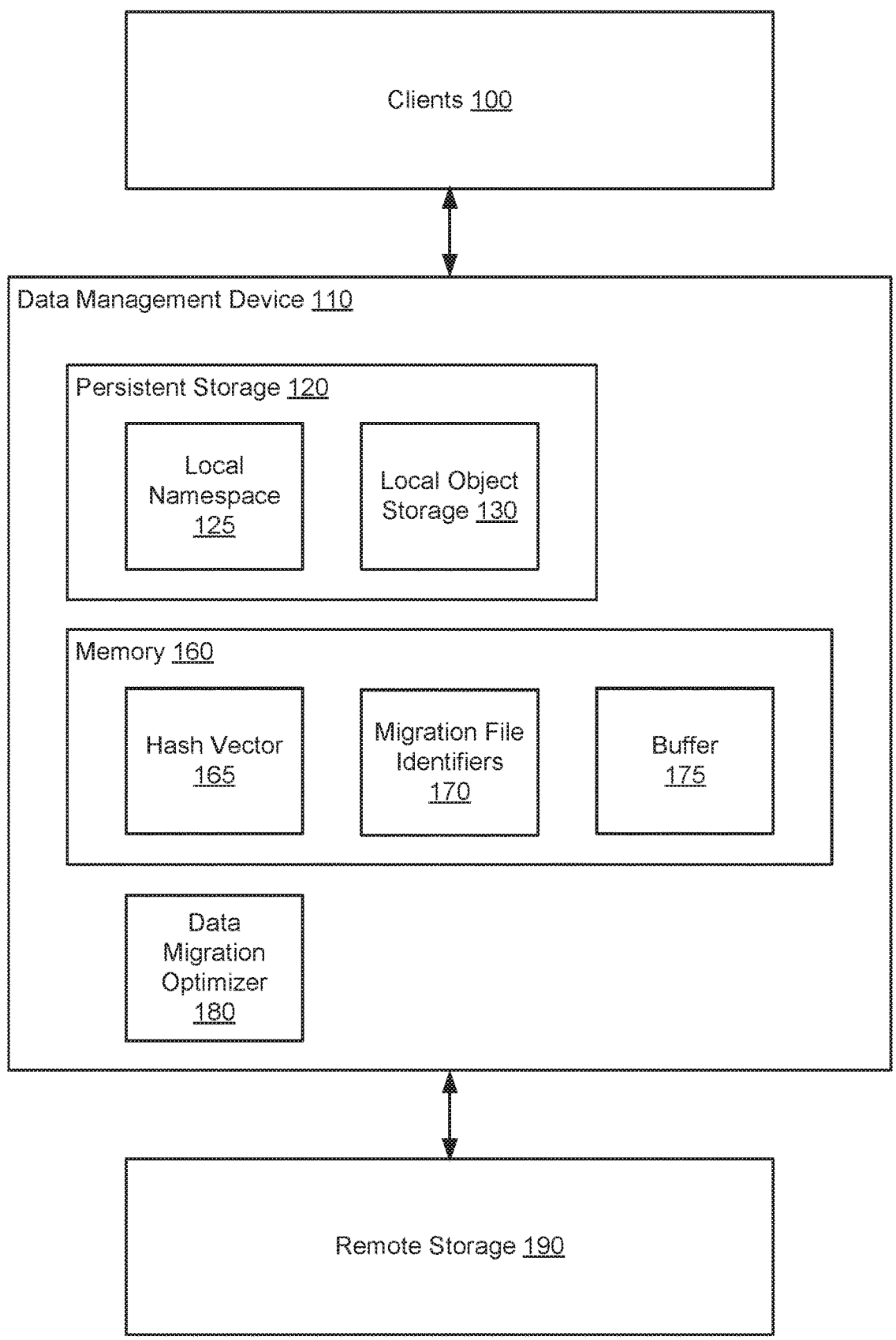
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for migrating data between storage. More specifically, the systems, devices, and methods may reduce the amount of data transmitted from a first storage to a second storage when migrating data from the first storage to the second storage. Additionally, the amount of storage space used to store the data on the second storage may be reduced when compared to the amount of storage used to store the data on the first storage.

In one or more embodiments of the invention, a data management device may deduplicate data stored in a persistent storage before transmitting the data for storage to a remote storage. The persistent storage may be organized as an object storage. The data management device may deduplicate the data by identifying duplicate data segments, deleting the duplicate data segments, and only transmitting the segments to the remote storage that were not deleted. Removing the duplicate data segments may reduce the quantity of storage required to store the data in the remote storage when compared to the quantity of storage space required to store the data in the data management device.

In one or more embodiments of the invention, the deduplication may be performed as part of a file migration process. For example, when files are migrated from a data storage device offering a high tier of service to a remote storage that offers a different tier of service than the high tier of service, the data may be deduplicated before being transmitted to the remote storage device. The different tier of service may be, for example, a lower tier of service that is less costly or a higher tier of service that is more costly.

FIG. 1 shows a system in accordance with one or more embodiments of the invention. The system may include clients (100) that store data in the data management device (110).

The clients (100) may be computing devices. The computing devices may be, for example, mobile phones, tablet computers, laptop computers, desktop computers, a server, or a cloud resource that aggregates the computing capacity of multiple computing devices and presents itself as a single logical computing device. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (100) may be other types of computing devices without departing from the invention. The clients (100) may be operably linked to the data management device (110) via a network.

The remote storage (190) may be a computing device. The computing device may be, for example, a mobile phone, a tablet computer, a laptop computer, desktop computer, a server, or a cloud resource that aggregates the computing capacity of multiple computing devices and presents itself as a single logical computing device. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The remote storage (190) may be other types of computing devices without departing from the invention.

The remote storage (190) may be operably linked to the data management device (110) via a network. For additional details regarding the remote storage (190), See FIG. 1f.

The data management device (110) may be a computing device. The computing device may be, for example, a mobile phone, a tablet computer, a laptop computer, a desktop computer, a server, or a cloud resource that aggregates the computing capacity of multiple computing devices and presents itself as a single logical computing device. The computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application and illustrated in at least FIGS. 3A-3E. The data management device (110) may be other types of computing devices without departing from the invention.

The data management device (110) may include a persistent storage (120), a memory (160), and a data migration optimizer (180). Each component of the data management device (110) is discussed below.

The data management device (110) may include a persistent storage (120). The persistent storage (120) may include physical storage devices. The physical storage devices may be, for example, hard disk drives, solid state drives, tape drives, or any other type of persistent storage media. The persistent storage (120) may include any number and/or combination of physical storage devices.

The persistent storage (120) may include a local object storage (130) for storing data from the clients (100). As used herein, an object storage is a data storage architecture that manages data as objects. Each object may include a number of bytes for storing data in the object. In one or more embodiments of the invention, the object storage does not include a file system. Rather, a local namespace (125) may be used to organize the data stored in the object storage. For additional details regarding the object storage (130), see FIGS. 1B-1D.

The local object storage (130) may be a partially deduplicated storage. As used herein, a partially deduplicated storage refers to a storage that attempts to reduce the required amount of storage space to store data by not storing multiple copies of the same files or bit patterns located near the storage location of the data within the object storage when a the data is first stored in the object storage. A partially deduplicated storage attempts to balance the input-output (IO) limits of the physical devices on which the object storage is stored by only comparing the to-be-stored data to a portion of all of the data stored in the object storage.

To partially deduplicate data, the to-be-stored data may be broken down into segments. The segments may correspond to portions of the to-be-stored data. Fingerprints that identify each segment of the to-be-stored data may be generated. The generated fingerprints may be compared to a portion of pre-existing fingerprints associated with a portion of the data already stored in the object storage. Any segments of the to-be-stored data that do not match a fingerprint of the portion of the data already stored in the object storage may be stored in the object storage, the other segments are not stored in the object storage. A file recipe to generate the now-stored data may be generated and stored so that the now-stored data may be retrieved from the object storage. The recipe may include information that enables all of the segments of the to-be-stored data that were stored in the object storage and all of the segments of the data already stored in the object storage having fingerprints that matched the fingerprints of the segments of the to-be-stored data to be retrieved from the object storage. For additional details regarding file recipes, See FIG. 1C.

As used herein, a fingerprint may be a bit sequence that virtually uniquely identifies a segment. As used herein, virtually uniquely means that the probability of collision between each fingerprint of two segments that include different data is negligible, compared to the probability of other unavoidable causes of fatal errors. In one or more embodiments of the invention, the probability is $10^{-20}$ or less. In one or more embodiments of the invention, the unavoidable fatal error may be caused by a force of nature such as, for example, a tornado. In other words, the fingerprint of any two segments that specify different data will virtually always be different.

The persistent storage (120) may include the local namespace (125). The local namespace (125) may be a data structure stored on physical storage devices of the persistent storage (120) that organizes the data storage resources of the physical storage devices.

In one or more embodiments of the invention, the local namespace (125) may associate a file with a file recipe stored in the object storage. The local namespace (125) may include information required to obtain the file recipe from the object storage. The information may specify an identifier of the object in which the file recipe is stored. The information may also specify a relative position within the object where the file recipe is stored. The object recipe may be used to generate the file based using segments stored in the object storage. For additional details regarding file recipes, See FIG. 1C.

The data management device (110) may include a memory (160). The memory (160) may store a hash vector (165). The hash vector (165) may be a data structure including a number of bits corresponding to the number of unique segments stored in the local object storage (130). Each bit of the hash vector (165) may correspond to a fingerprint of a segment stored in the local object storage (130). Fingerprints of multiple segments may be mapped to the same bit of the hash vector (165). Each of the fingerprints of the multiple segments that map to the same bit of the hash vector (165) may be identical, i.e., each of the segments corresponding to the fingerprints that each map to the same bit of the hash vector may be identical.

In one or more embodiments of the invention, the hash vector may be generated by a collision free hash function based on all of the fingerprints stored in the object storage. The collision free hash function may be a perfect hash function.

The memory (160) may store migration file identifiers (170). The migration file identifiers (170) may be a data structure that specifies one or more files stored in the local object storage (130) that are to be migrated to the remote storage (190). The migration file identifiers (170) may be generated using the method shown in FIG. 3B.

The memory (160) may store a buffer (175). The buffer (175) may be a data structure that includes deduplicated segments of the to-be-migrated files of the object storage and/or fingerprints of the deduplicated segments. The buffer may be used to migrate the to-be-migrated files to the remote storage.

The data management may include a data migration optimizer (180). The data migration optimizer (180) may deduplicate the to-be-migrated files of the local object storage (130) as part of the file migration process. Deduplicating the to-be-migrated files of the local object storage (130) before migration may reduce the amount of data required to be transmitted to the remote storage as part of the migration process and may reduce the amount of storage space of the remote storage required to store the to-be-migrated files.

In one or more embodiments of the invention, the data migration optimizer (180) may be a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described above and to perform the methods shown in FIGS. 3A-3.

In one or more embodiments of the invention, the data migration optimizer (180) may be implemented as computer instructions, e.g., computer code, stored on a persistent storage that when executed by a processor of the data management device (110) cause the data management device (110) to provide the functionality described above and perform the methods shown in FIGS. 3A-3E.

As discussed above, the local object storage (130) may store data. The local object storage (130) may store additional information. FIG. 1B shows a diagram of a local object storage (130) in accordance with one or more embodiments of the invention. The local object storage (130) may different types of data include segments (135), segment fingerprints (140), file recipes (145), and file meta-data (150). Any combination of the aforementioned types of data may be stored in any object of the object storage without departing form the invention. Each type of data is discussed below.

The segments (135) may be data structures including portions of data. The segments (135) may be used to reconstruct files stored in the local object storage (130). The segments (135) may be portions of multiple files, i.e., two different files that include the same segment. For example two versions of the same word document with minimal differences may both include nearly the same number of segments. The majority each of the segments of both word documents may be identical. Only a single copy of any duplicate segments may be stored in the object storage.

The segment fingerprints (140) may be fingerprints corresponding to each of the segments (135). Each segment fingerprint (140A, 140N) may be generated automatically when a corresponding segment (135A, 135N) is stored in the object storage. Each segment fingerprint (140A, 140N) may uniquely identify a corresponding bit sequence. Thus, each segment having the same segment fingerprint is the same bit sequence.

The file recipes (145) may be data structures that enable a number of segments that may be used to reconstruct a file to be retrieved from the object storage. As described above, when a file, e.g., data, is stored in the object storage, it is broken down into segments and deduplicated. Thus, not all of the segments of each file are stored in the object storage. Rather, only segments of the file that are not already present in the object storage are stored in the object storage when the file is stored in the object storage. For additional details regarding the file recipes (145), See FIG. 1C.

The file meta-data (150) may be data structures that specify meta-data associated with each file stored in the object storage. For additional details regarding the file meta-data (150), See FIG. 1D.

Figure 1B:
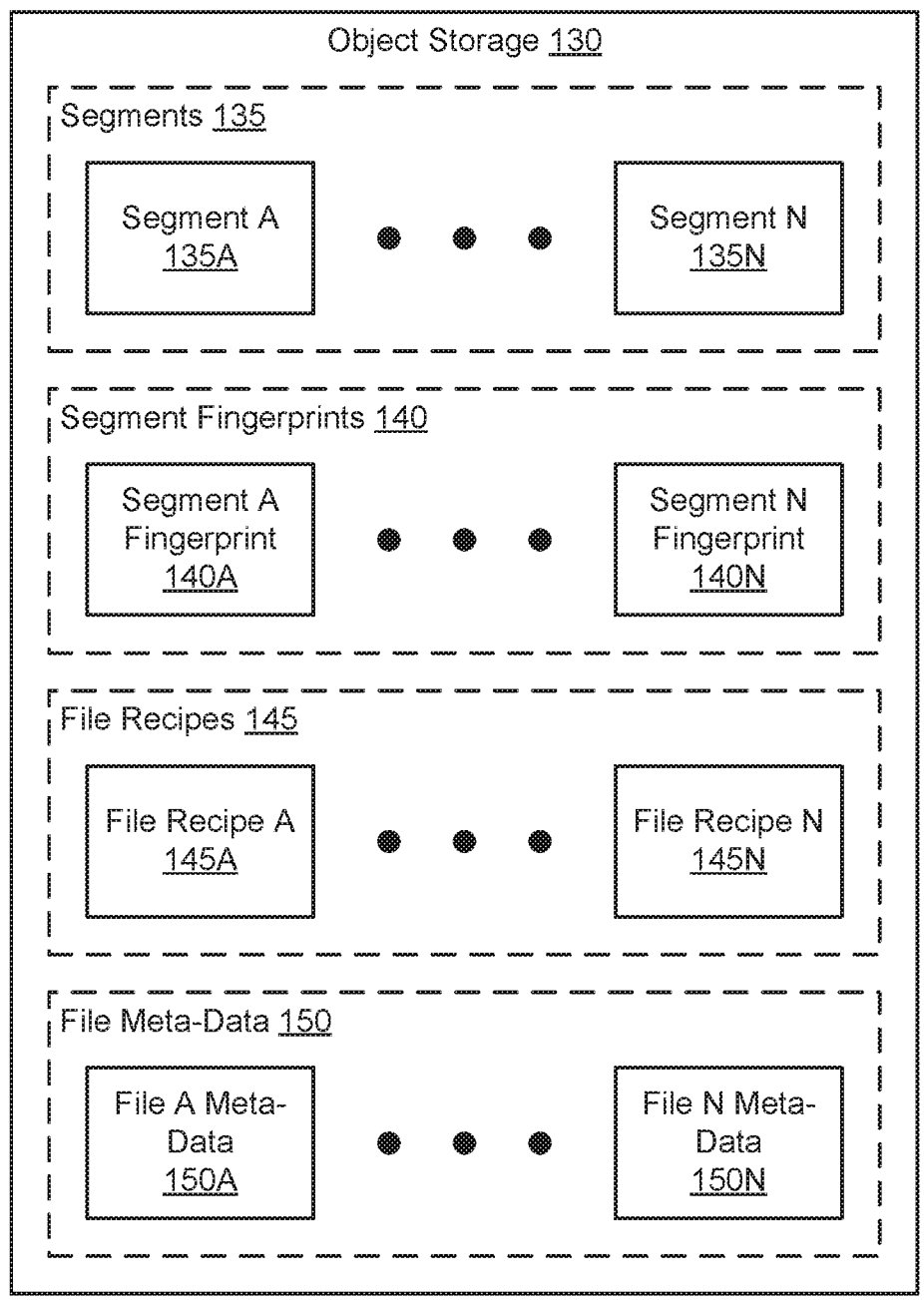
FIG. 1B shows a diagram of an object storage in accordance with one or more embodiments of the invention.
Figure 1C:
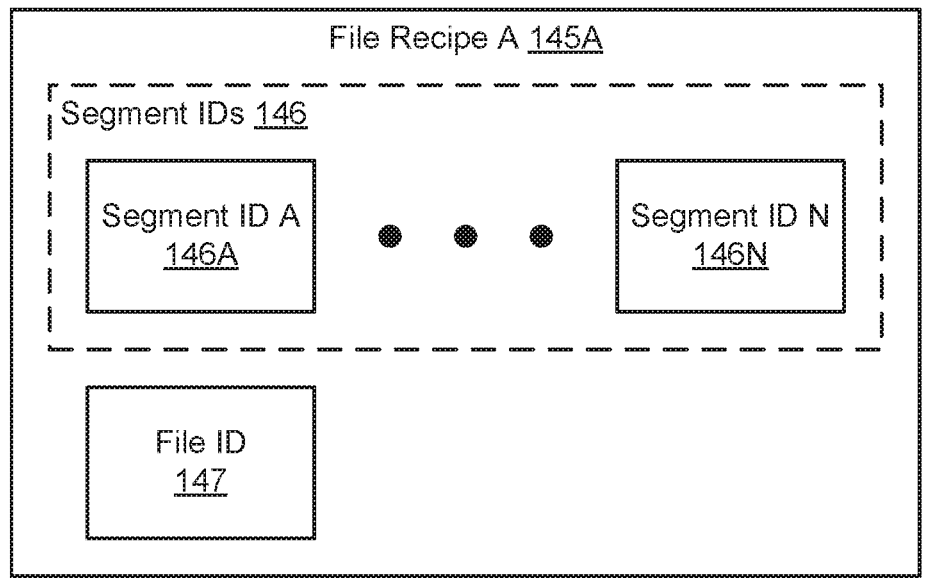
FIG. 1C shows a diagram of a file recipe in accordance with one or more embodiments of the invention.

Returning to the file recipes (145), FIG. 1C shows a diagram of a file recipe A (145A) in accordance with one or more embodiments of the invention. The file recipe A (145A) specifies information used to reconstruct a file stored in the file storage.

In one or more embodiments of the invention, the file recipe A (145A) includes segments identifiers (ID) (146) that specify the identifiers of each segment used to reconstruct the file. The file ID (147) identifies the file.

In one or more embodiments of the invention, the file recipe A (145A) includes only a single segment ID and a file ID. The single segment ID may enable a segment to be retrieved from the object storage. The single segment includes a top level of a tree data structure rather than a portion of a file. The tree may be a segment tree stored in the object storage. Portions of the tree may specify nodes of the tree while other portions of the tree may include segments. The top level of the tree includes information that enables the lower levels of the tree to be obtained from the object storage. Traversing the segment tree using the information included in the tree may enable of the segments used to regenerate the file to be obtained.

While two embodiments of the file recipes used herein have been described above, the file recipes may have other structures without departing from the invention. Embodiments of the file recipe include any data structure that enables segments of a file to be retrieved from the object storage.

In one or more embodiments of the invention, the file recipe A (145A) may include other information that may be used to obtain the segments. For example, information that identifies an object of the object storage that includes a segment may be included. Additionally, the other information may also specify where within an object the segment is located. In other embodiments of the invention, each object may be self-describing, i.e., specifies the contents of the object and the location of the contents within the object. The file recipe may only specify the objects including each respective segment specified by the file recipe.

The file ID (147) may correspond to one or more namespace entries that relate file names or other identification information provided by clients with the name of the file stored in the object storage. When a client requests data stored in the object storage, the data management device may match the file name or other ID provided by the client to a namespace entry. The namespace entry may specify the file ID (147) and, thus, enable the data management device to obtain the file recipe corresponding to the stored file. The data management device may then use the segments specified by the file recipe to obtain the file be reconstructing it using the segments specified by the file recipe.

Figure 1D:
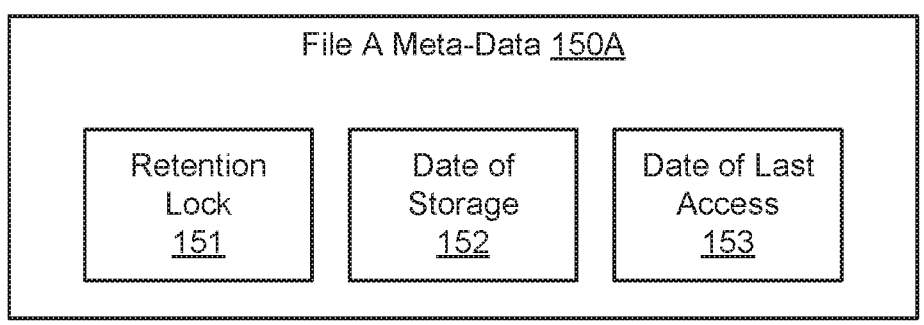
FIG. 1D shows a diagram of an example of meta-data associated with a file stored in an object storage in accordance with one or more embodiments of the invention.

FIG. 1D shows a diagram of file A meta-data (150A) in accordance with one or more embodiments of the invention. The file A meta-data (150A) may specify meta-data of the file stored in the object storage corresponding to the file ID (147, FIG. 1C) of the file recipe A (145A). The file A meta-data (150A) may include a retention lock (151), a date of storage (152) of the file in the object storage, and/or a date of last access (153) of the file in the object storage. The file A meta-data (150A) may include different, more, or less data regarding the associated file without departing from the invention.

Figure 1E:
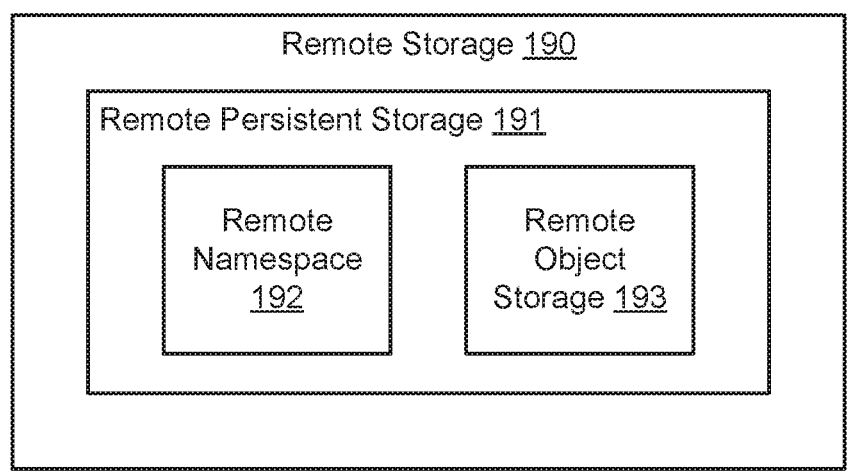
FIG. 1E shows a diagram of a remote storage in accordance with one or more embodiments of the invention.

As discussed with respect to FIG. 1A, the data management device may migrate files to a remote storage. The remote storage may store the migrated data FIG. 1E shows a diagram of a remote storage (190) in accordance with one or more embodiments of the invention. The remote storage (190) may include a remote persistent storage (191). The remote persistent storage (191) may be similar to the local persistent storage and include a remote namespace (192) and a remote object storage (193). Each of the aforementioned components may be similar to the local namespace) and the local object storage, respectively, and perform similar functions.

The remote storage (190) may be programmed to cooperate with the data management device (110) to migrate files from the data management device (110) to the remote storage (190).

Figure 2A:
FIG. 2A shows a diagram of a file in accordance with one or more embodiments of the invention.
Figure 2B:
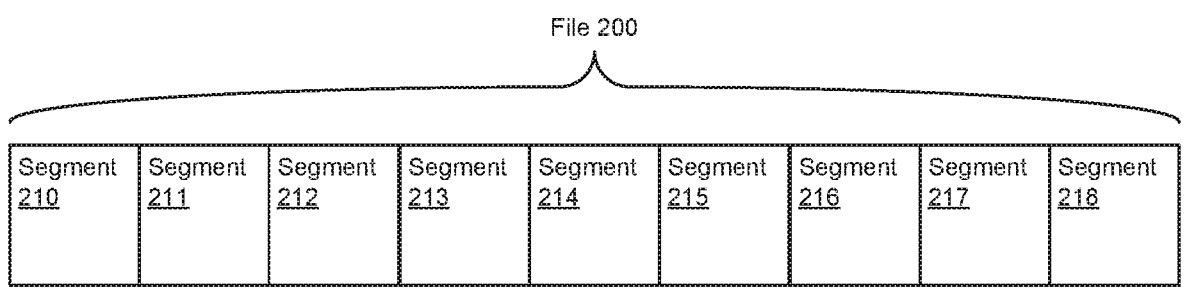
FIG. 2B shows a diagram of a relationship between segments of a file and the file in accordance with one or more embodiments of the invention.

As discussed above, when a file is sent to the data management device for storage, the data management device may divide the file into segments. FIGS. 2A-2B show diagrams that illustrate relationships between a file (200) and segments (210-218) of the file (200).

FIG. 2A shows a diagram of a file (200) in accordance with one or more embodiments of the invention. The data may be any type of data in any format and of any length.

FIG. 2B shows a diagram of segments (210-218) of the file (200) of the data. Each segment may include separate, distinct portions of the file (200). Each of the segments may be of different, but similar lengths. For example, each segment may include approximately 8 kilobytes of data, e.g., a first segment may include 8.03 kilobytes of data, the second segment may include 7.96 kilobytes of data, etc. In one or more embodiments of the invention, the average amount of data of each segment is between 7.95 and 8.05 kilobytes.

FIGS. 3A-3F show flowcharts in accordance with one or more embodiments of the invention. The flowcharts illustrate methods that may be used to deduplicate files during migration to a remote storage. As discussed above, when data is stored in the object storage, it may only be partially deduplicated and thereby reduce the required IO of the storage when compared to complete deduplication of the data. The following methods may be used to completely deduplicate the partially deduplicated files already stored in an object storage during a migration of the files to a remote storage. However, embodiments of the invention are not limited to deduplicating data that has been partially deduplicated. The following methods may be used to deduplicate files that have not been previous deduplicated.

Figure 3A:
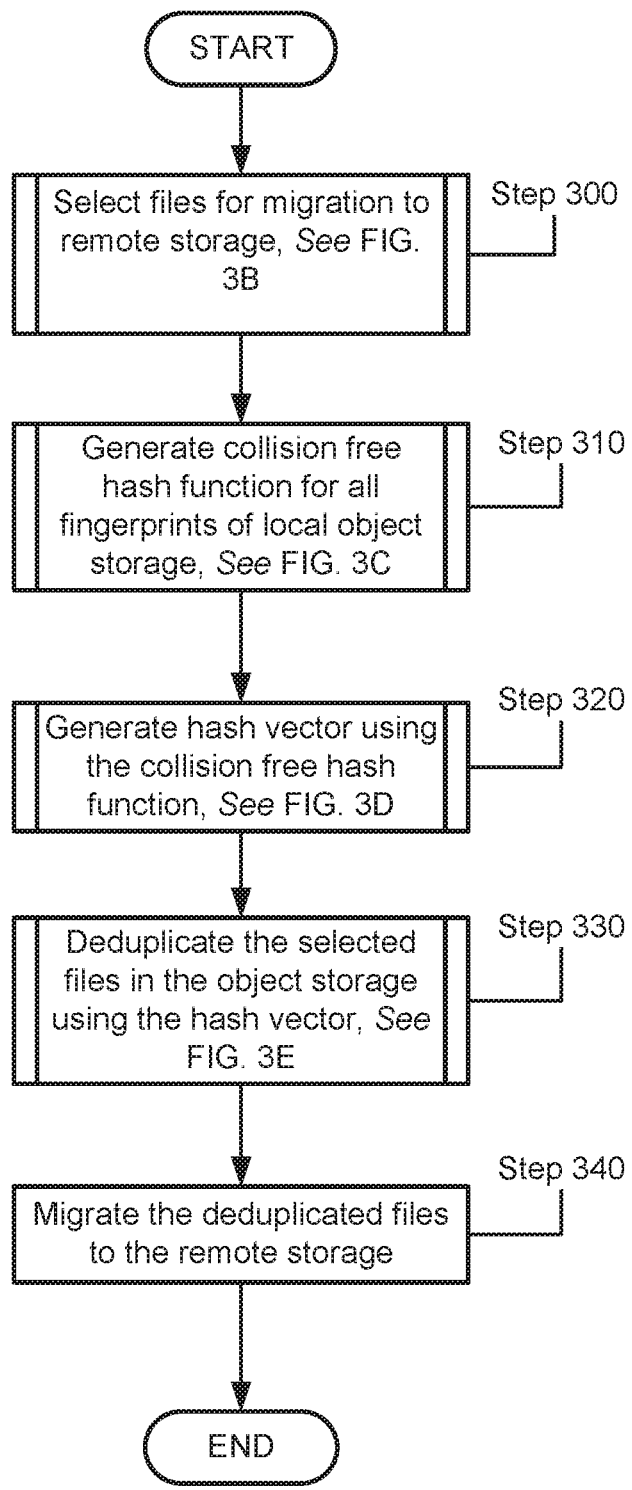
FIG. 3A shows a flowchart of a method of deduplicating data in accordance with one or more embodiments of the invention.

FIG. 3A shows a flowchart of a method in accordance with one or more embodiments of the invention. The method depicted in FIG. 3A may be used to deduplicate data stored in a data storage in accordance with one or more embodiments of the invention. The method shown in FIG. 3A may be performed by, for example, a data migration optimizer (180, FIG. 1A).

In Step 300, files are selected for migration to a remote storage. The selected files may be identified using the method shown in FIG. 3B.

In Step 310, a collision free hash function for all fingerprints of a local object storage storing the selected files are generated. The collision free hash function may be generated using the method shown in FIG. 3C.

In Step 320, a hash vector is generated using the collision free hash function. The hash vector may be generated using the method shown in FIG. 3D.

In Step 330, the selected files are deduplicated using the hash vector. The object storage may be deduplicated using the method shown in FIG. 3E.

In Step 340, the deduplicated files are migrated to the remote storage.

In one or more embodiments of the invention, the deduplicated files may be migrated to the remote storage by sending fingerprints of the deduplicated files to the remote storage. The remote storage may then compare the fingerprints to existing fingerprints stored in a remote object storage of the remote storage. The remote storage may then notify the data management device of any fingerprints that are not present in the remote storage. The remote storage may then send copies of the segments corresponding to the fingerprints that are not already stored in the remote storage.

The method may end following Step 340.

Figure 3B:
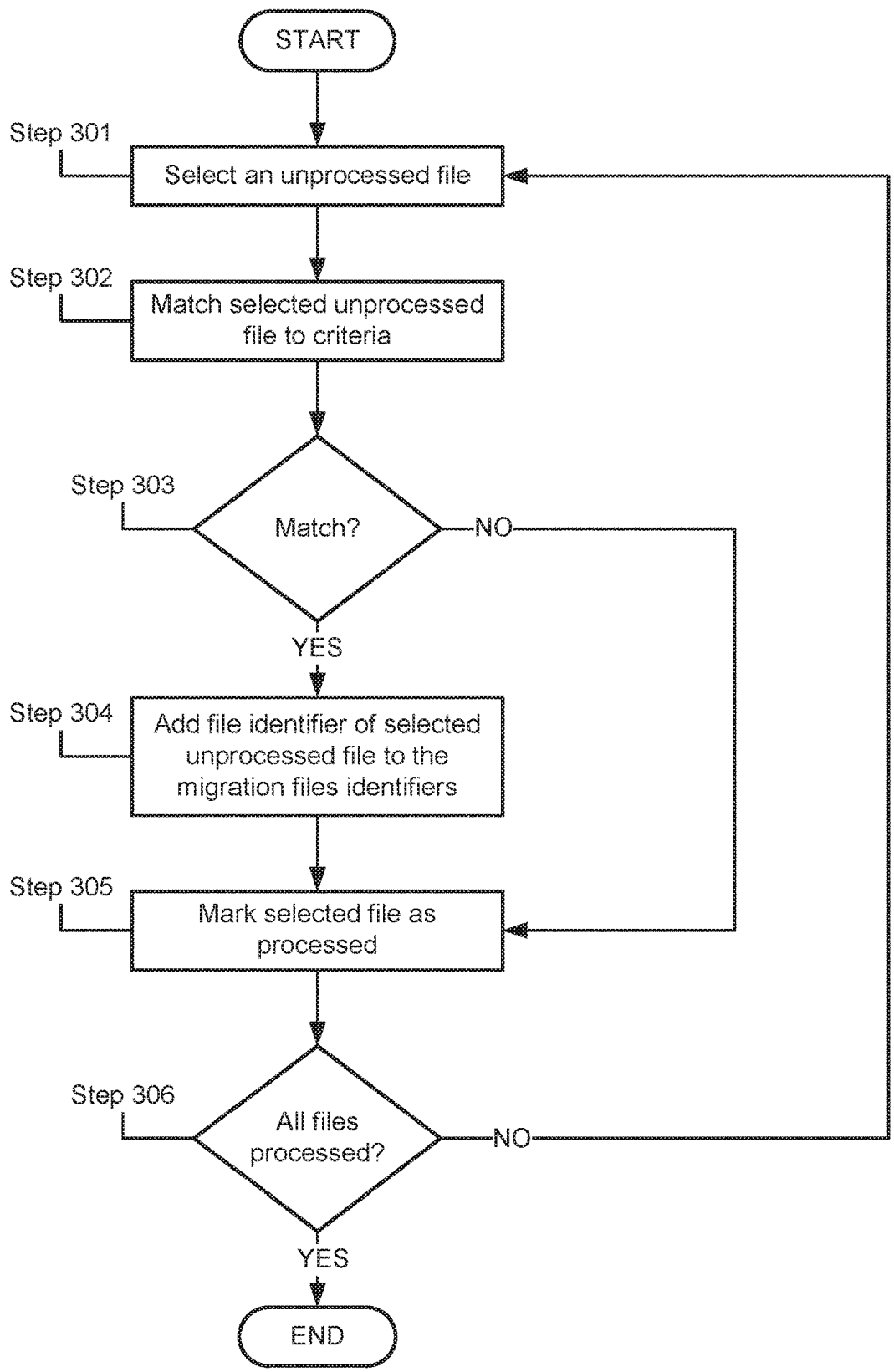
FIG. 3B shows a flowchart of a method of identifying cold files in accordance with one or more embodiments of the invention.

FIG. 3B shows a flowchart of a method in accordance with one or more embodiments of the invention. The method depicted in FIG. 3B may be used to select files for migration to a remote storage in accordance with one or more embodiments of the invention. The method shown in FIG. 3B may be performed by, for example, a data migration optimizer (180, FIG. 1A).

In Step 301, an unprocessed file stored in the local object storage is selected.

In one or more embodiments of the invention, the file is selected randomly. In other words, any unprocessed file is selected. All of the files stored in the object storage may be unprocessed at the start of the method shown in FIG. 3B.

In Step 302, the selected unprocessed file is matched to criteria.

In one or more embodiments of the invention, the criteria may include: (i) whether a retention lock specified by meta-data associated with the file is set to indicate that the file should be retained, (ii) whether a date of storage specified by meta-data associated with the file is earlier than a predetermined date, and/or (iii) whether a data of last access specified by the meta-data associated with the file is earlier than predetermined date. The criteria may include other criteria without departing from the invention. The criteria may only include one of (i)-(iii) without departing from the invention.

In one or more embodiments of the invention, the predetermined date six months before the current date, i.e., the date at the time the method illustrated in FIG. 3B is performed. In one or more embodiments of the invention, the predetermined date three months before the current date, i.e., the date at the time the method illustrated in FIG. 3B is performed. In one or more embodiments of the invention, the predetermined date one month before the current date, i.e., the date at the time the method illustrated in FIG. 3B is performed.

In Step 303, it is determined whether the selected unprocessed file matches a criteria. If the selected unprocessed file matches a criteria, the method proceeds to Step 304. If the selected unprocessed file does not match a criteria, the method proceeds to Step 305.

In Step 304, the file identifier of the selected unprocessed file is added to the migration files identifier.

In Step 305, the selected unprocessed file is marked as processed.

In Step 306, it is determined whether all of the files stored in the object storage have been processed. If all of the files have been processed, the method may end following Step 306. If all of the files have not been processed, the method may proceed to Step 301.

Figure 3C:
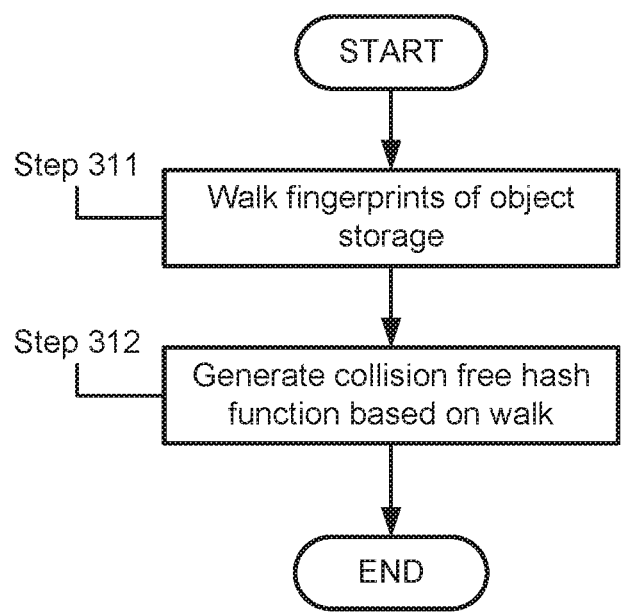
FIG. 3C shows a flowchart of a method of generating a collision free hash function in accordance with one or more embodiments of the invention.

FIG. 3C shows a flowchart of a method in accordance with one or more embodiments of the invention. The method depicted in FIG. 3C may be used to generate a collision free hash function for the local object storage in accordance with one or more embodiments of the invention. The method shown in FIG. 3C may be performed by, for example, a storage space optimizer (175, FIG. 1A).

In Step 311, the fingerprints stored in the local object storage are walked.

In Step 312, a collision free hash function is generated based on the walk.

In one or more embodiments of the invention, the collision free hash function may be a perfect hash function. The perfect hash function may map each of the unique fingerprints walked in Step 311 to different bits of a bit vector. Multiple fingerprints walked in Step 311 that have the same bit sequence map to the same bit of the bit vector.

The method may end following Step 312.

Figure 3D:
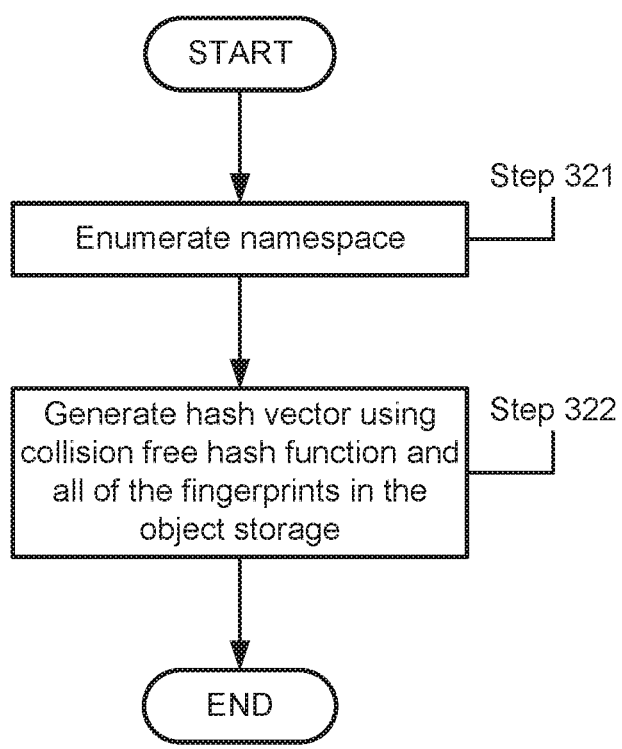
FIG. 3D shows a flowchart of a method of generating a hash vector in accordance with one or more embodiments of the invention.

FIG. 3D shows a flowchart of a method in accordance with one or more embodiments of the invention. The method depicted in FIG. 3D may be used to generate a hash vector in accordance with one or more embodiments of the invention. The method shown in FIG. 3D may be performed by, for example, a storage space optimizer (175, FIG. 1A).

In Step 321, the namespace of the local object storage is enumerated.

In Step 322, a hash vector is generated using the collision free hash function and all of the fingerprints in the local object storage.

In one or more embodiments of the invention, the hash vector is a perfect hash live vector generated using a perfect hash function.

The method may end following Step 322.

Figure 3E:
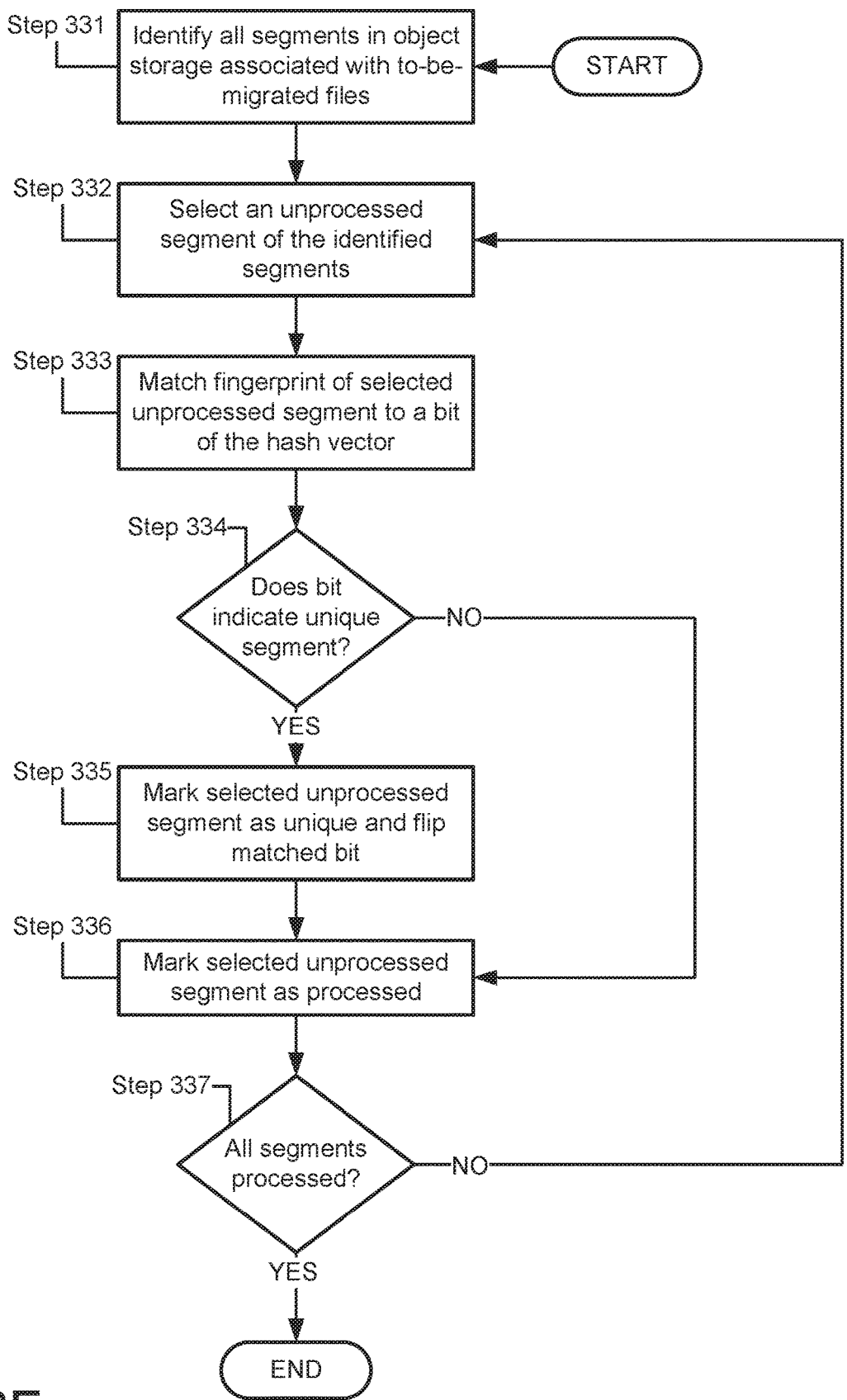
FIG. 3E shows a flowchart of a method of deduplicating an object storage using the hash vector in accordance with one or more embodiments of the invention.

FIG. 3E shows a flowchart of a method in accordance with one or more embodiments of the invention. The method depicted in FIG. 3E may be used to deduplicate an object storage in accordance with one or more embodiments of the invention. The method shown in FIG. 3E may be performed by, for example, a storage space optimizer (175, FIG. 1A).

In Step 331, all of the segments associated with the to-be-migrated files are identified. The segments may be identified using the files recipe for each to-be-migrated file. The to-be-migrated files may be those selected using the method shown in FIG. 3B.

While not illustrated in FIG. 3E, the segments may be marked as unique while being enumerated by setting corresponding bits of the perfect hash vector. In other words, the process of identifying unique segments may be accomplished by setting corresponding bits in the perfect hash vector when enumerating the segments.

In Step 332, an unprocessed segment of the identified segments is selected.

In Step 333, a fingerprint of the selected unprocessed segment is matched to a bit of the hash vector. The fingerprint may be matched to the hash vector using the collision free hash function.

In Step 334, it is determined whether the matched bit indicates that the selected unprocessed segment is unique. In other words, it is determined whether a previously processed fingerprint matched to the matched bit before the fingerprint of the selected unprocessed segment matched to the bit of the hash vector. If the matched bit indicates that the unprocessed segment is unique, the method proceeds to Step 335. If the matched bit does not indicate that the unprocessed segment is unique, the method proceeds to Step 336.

In one or more embodiments of the invention, the value of the matched bit may indicate whether the unprocessed segment is unique. When the hash vector is generated, each bit may be set to a predetermined value. If a bit is not the predetermined value when a fingerprint is matched to the bit, the segment associated with the matched fingerprint may be considered to not be unique.

In Step 335, the selected unprocessed segment is marked as unique and the bit of the hash vector to which the fingerprint associated with the unprocessed segment was matched is flipped.

In one or more embodiments of the invention, the selected unprocessed segment may be marked as unique by adding a copy of the selected unprocessed segment to a buffer. In one or more embodiments of the invention, the selected unprocessed segment in the object storage may be marked by adding the segment to a list, or other data structure, that specifies unique segments.

In Step 335, the selected unprocessed segment is marked as processed.

In Step 336, it is determined whether all of the segments of the object storage have been processed. If all of the segments have been processed, the method proceeds to Step 337. If all of the segments have not been processed, the method proceeds to Step 332.

The method may end following Step 337.

One or more embodiments of the invention may be implemented using instructions executed by one or more processors in the data storage device. Further, such instructions may correspond to computer readable instructions that are stored on one or more non-transitory computer readable mediums.

One or more embodiments of the invention may enable one or more of the following i) improve the performance of a network by reducing the amount of bandwidth used to migrate data, ii) improve the storage capacity of a remote storage by reducing the amount of storage require to store migrated data, and iii) reduce the computational burden required to migrate files by only sending fingerprints associated with unique segments for evaluation by the remote storage to determine whether the unique segment is already present in an object storage of the remote storage.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for deduplicating data, comprising:
    identifying in a persistent storage device, a first copy of a file segment;
    obtaining, based on the identifying of the first copy of the file segment, a fingerprint associated with file segment;
    identifying an indicator in a hash vector corresponding to the fingerprint, wherein the hash vector comprises a plurality of indicators;
    determining that the indicator is set to a predetermined value, wherein the predetermined value indicates that the file segment is unique;
    in response to determining that the indicator is set to the predetermined value:
        storing the first copy of the file segment in a buffer;
        modifying the indicator to a value other than the predetermined value;
    after the modifying:
        identifying, in the persistent storage device, a second copy of the file segment;
        obtaining, based on the identifying of the second copy of the file segment, the fingerprint;
        identifying the indicator in the hash vector corresponding to the fingerprint;
        determining that the indicator is not set to the predetermined value;
        in response to determining that the indicator is not set to the predetermined value, marking the second copy of the file segment as processed and not storing the second copy of the file segment in the buffer; and
        initiating a deduplication procedure to replicate the first copy of the file segment from the persistent storage device to a remote storage device, wherein the deduplication procedure uses the buffer.

2. The method of claim 1, wherein the persistent storage device comprises:
    the first copy of the file segment; and
    a second copy of the file segment, wherein the second copy of the file segment is not replicated to the remote storage device.

3. The method of claim 1, further comprising:
    prior to obtaining the fingerprint:
        selecting the file segment; and
        adding the indicator, to the hash vector, wherein adding the indicator comprises set the indicator the predetermined value.

4. The method of claim 3, wherein selecting the file segment comprises:
    identifying a file from a plurality of files;
    making a determination that the file matches a criterion; and
    in response to the determination that file matches the criterion, identifying, in the file, the file segment.

5. The method of claim 4, wherein the criterion is one selected from the group consisting of file segment age, file segment storage date, and redundancy policy.

6. A non-transitory computer readable medium comprising computer readable program code, which when executed by a computer processor enables the computer processor to perform a method for deduplicating data, the method comprising:
    identifying in a persistent storage device, a first copy of a file segment;
    obtaining, based on the identifying of the first copy of the file segment, a fingerprint associated with the file segment;
    identifying an indicator in a hash vector corresponding to the fingerprint, wherein the hash vector comprises a plurality of indicators;
    determining that the indicator is set to a predetermined value, wherein the predetermined value indicates that the file segment is unique;
    in response to determining that the indicator is set to the predetermined value:
        storing the first copy of the file segment in a buffer;
        modifying the indicator to a value other than the predetermined value;
    after the modifying:
        identifying, in the persistent storage device, a second copy of the file segment;
        obtaining, based on the identifying of the second copy of the file segment, the fingerprint;
        identifying the indicator in the hash vector corresponding to the fingerprint;
        determining that the indicator is not set to the predetermined value;
        in response to determining that the indicator is not set to the predetermined value, marking the second copy of the file segment as processed and not storing the second copy of the file segment in the buffer; and
        initiating a deduplication procedure to replicate the first copy of the file segment from the persistent storage device to a remote storage device, wherein the deduplication procedure uses the buffer.

7. The non-transitory computer readable medium of claim 6, wherein the persistent storage device comprises:
    the first copy of the file segment; and
    a second copy of the file segment, wherein the second copy of the file segment is not replicated to the remote storage device.

8. The non-transitory computer readable medium of claim 6, further comprising:
    prior to obtaining the fingerprint:
        selecting the file segment; and
        adding the indicator, to the hash vector, wherein adding the indicator comprises set the indicator the predetermined value.

9. The non-transitory computer readable medium of claim 8, wherein selecting the file segment comprises:
 identifying a file from a plurality of files;
 making a determination that the file matches a criterion; and
 in response to the determination that file matches the criterion, identifying, in the file, the file segment.

10. The non-transitory computer readable medium of claim 9, wherein the criterion is one selected from the group consisting of file segment age, file segment storage date, and redundancy policy.

11. A data management device, comprising:
 persistent storage device; and
 a processor programmed to:
  identify, in a persistent storage device, a first copy of a file segment;
  obtain, based on the identifying of the first copy of the file segment, a fingerprint associated with the file segment;
  identify an indicator in a hash vector corresponding to the fingerprint, wherein the hash vector comprises a plurality of indicators;
  determine that the indicator is set to a predetermined value, wherein the predetermined value indicates that the file segment is unique;
  in response to determine that the indicator is set to the predetermined value:
   store the first copy of the file segment in a buffer;
   modify the indicator to a value other than the predetermined value;
  after the modify:
   identify, in the persistent storage device, a second copy of the file segment;
   obtain, based on the identifying of the second copy of the file segment, the fingerprint;
   identify the indicator in the hash vector corresponding to the fingerprint;
   determine that the indicator is not set to the predetermined value;
   in response to determining that the indicator is not set to the predetermined value, mark the second copy of the file segment as processed and not storing the second copy of the file segment in the buffer; and
  initiate a deduplication procedure to replicate the first copy of the file segment from the persistent storage device to a remote storage device, wherein the deduplication procedure uses the buffer.

12. The data management device of claim 11, wherein the persistent storage device comprises:
 the first copy of the file segment; and
 a second copy of the file segment, wherein the second copy of the file segment is not replicated to the remote storage device.

13. The data management device of claim 5, wherein the processor is further configured to:
 prior to obtaining the fingerprint:
  select the file segment; and
  add the indicator, to the hash vector, wherein adding the indicator comprises set the indicator the predetermined value.

14. The data management device of claim 13, wherein selecting the file segment comprises:
 identifying a file from a plurality of files;
 making a determination that the file matches a criterion; and
 in response to the determination that file matches the criterion, identifying, in the file, the file segment.

15. The data management device of claim 14, wherein the criterion is one selected from the group consisting of file segment age, file segment storage date, and redundancy policy.

* * * * *

UNITED STATES PATENT AND TRADEMARK OFFICE
CERTIFICATE OF CORRECTION

PATENT NO.          : 10,860,212 B1
APPLICATION NO.     : 15/656588
DATED               : December 8, 2020
INVENTOR(S)         : Ramprasad Chinthekindi et al.

Page 1 of 1

It is certified that error appears in the above-identified patent and that said Letters Patent is hereby corrected as shown below:

In the Claims

Column 11, Line 33 in Claim 1, the phrase "associated with file segment" should be -- associated with the file segment --.

Column 12, Line 5 in Claim 3, the phrase "set the indicator the predetermined" should read -- set the indicator to the predetermined --.

Column 12, Line 66 in Claim 8, the phrase "set the indicator the predetermined" should read -- set the indicator to the predetermined --.

Column 13, Line 26 in Claim 14, the phrase "determine that the indicator" should read -- determining that the indicator --.

Column 14, Line 19 in Claim 13, the phrase "device of claim 5" should read -- device of claim 11 --.

Column 13, Line 26 in Claim 14, the phrase "set the indicator the predetermined" should read -- set the indicator to the predetermined --.

Signed and Sealed this
First Day of June, 2021

Drew Hirshfeld
*Performing the Functions and Duties of the
Under Secretary of Commerce for Intellectual Property and
Director of the United States Patent and Trademark Office*